United States Patent [19]

Luo et al.

[11] Patent Number: 5,070,227

[45] Date of Patent: Dec. 3, 1991

[54] PROCESES AND APPARATUS FOR REDUCING ELECTRODE WEAR IN A PLASMA ARC TORCH

[75] Inventors: Lifeng Luo, Lebanon, N.H.; Nicholas A. Sanders, Norwich, Vt.; Richard W. Couch, Jr., Hanover, N.H.

[73] Assignee: Hypertherm, Inc., Hanover, N.H.

[21] Appl. No.: 513,780

[22] Filed: Apr. 24, 1990

[51] Int. Cl.$^5$ .................................................. B23K 1/02
[52] U.S. Cl. ........................... 219/121.55; 219/121.54; 219/121.5; 219/121.48
[58] Field of Search ...................... 219/121.54, 121.48, 219/121.49, 121.5, 121.55, 121.56, 75

[56] References Cited

U.S. PATENT DOCUMENTS

| | | | |
|---|---|---|---|
| 4,195,216 | 3/1980 | Beauchamp et al. | 219/121.55 |
| 4,692,582 | 9/1987 | Marhic | 219/121.55 |
| 4,918,283 | 4/1990 | Yamado et al. | 219/121.55 |

FOREIGN PATENT DOCUMENTS 0068270 4/1982 Japan ............................... 219/121.55

Primary Examiner—Mark H. Paschall
Attorney, Agent, or Firm—Wolf, Greenfield & Sacks

[57] ABSTRACT

A process and apparatus for reducing wear of an electrode in a plasma arc torch involves altering the gas flow in a plasma chamber surrounding the electrode immediately before and continuing after cutting of the current that sustains the arc. The altering includes closing off the gas flow upstream of the chamber, switching from a swirling flow to a radial/axial flow through the plasma chamber, reducing the arc current level in conjunction with either of the above, and venting the plasma chamber to rapidly change the gas flow and pressure in the chamber. The interval is sufficient to reduce electrode wear, but short enough that the arc remains stabilized until cut-off. In the flow stop mode, a solenoid valve is placed on an inlet tube for the plasma gas. For venting, a vent tube and another solenoid valve are added to the torch. In the flow pattern switching mode, two independent gas supply lines with control valves feed separate sets of gas inlets to the plasma chamber, one set producing a swirling flow and the other set producing a radial then axial flow.

21 Claims, 4 Drawing Sheets

PROCESSES AND APPARATUS FOR REDUCING ELECTRODE WEAR IN A PLASMA ARC TORCH

BACKGROUND OF THE INVENTION

This invention relates in general to plasma arc cutting and welding processes and apparatus. More specifically, it relates to a process and apparatus for reducing electrode wear.

Plasma arc torches have a wide variety of applications such as the cutting of thick plates of steel and the cutting of comparatively thin sheets of galvanized metal commonly used in heating, ventillating and air conditioning (HVAC) systems. The basic components of a plasma arc torch include a torch body, an electrode (cathode) mounted within the body, a nozzle (anode) with a central exit orifice, a flow of an ionizable gas, electrical connections, passages for cooling, and arc control fluids, and a power supply that produces a pilot arc in the gas, typically between the electrode and the nozzle, and then a plasma arc, a conductive flow of the ionized gas from the electrode to a workpiece. The gas can be non-reactive, e.g. nitrogen, or reactive, e.g. oxygen or air.

Various plasma arc torches of this general type are described in U.S. Pat. Nos. 3,641,304 to Couch and Dean, 3,833,787 to Couch, 4,203,022 to Couch and Bailey, 4,421,970 to Couch, 4,791,268 to Sanders and Couch, 4,816,637 to Sanders and Couch, and 4,861,962 to Sanders and Couch, all commonly assigned with the present application. Plasma arc torches and related products are sold in a variety of models by Hypertherm, Inc. of Hanover, New Hampshire. The MAX 100 torch of Hypertherm is typical of the medium power torches (100 ampere output) using air as the working gas and useful for both plate fabrication and HVAC applications.

In all plasma arc torches, a common and heretofore unsolved problem has been a substantial wear of the electrode, particularly when the electrode is used with reactive gases such as oxygen or air. For example, the standard electrode for the MAX 100 brand torch of Hypertherm, Inc. shows wear as a generally concave pit on the lower end of the electrode, or more precisely, on an emitting element of hafnium mounted on the electrode. On average a wear depth of about 0.025 inch is observed in such a Hypertherm brand electrode after 120 cut cycles. The wear results of commercially available units of others, as measured by Hypertherm, Inc., are typically worse.

For the MAX 100 brand torch, when the wear produces a pit depth of 0.060 inch or more, Hypertherm recommends that the electrode be replaced. In ordinary use, the electrode of a plasma arc cutting torch operating with reactive gases typically requires replacement after 0.5 to 2 hours of use depending strongly on the number of on off cycles. Wear considerations are significant not only because they necessitate the repeated replacement of a component, but also because they limit the maximum power that can be applied to a given torch.

In plasma arc cutting, it is also important to note that the quality of the cut is highly dependent on the flow pattern of the gas in a plasma chamber, defined at least in part as the region between the electrode and the nozzle. In particular, a swirling flow produced by injecting the gas tangentially into the plasma chamber has been found to be essential to produce a high quality cut.

A swirling gas flow pattern is also important in stabilizing the plasma arc so that it exits the torch to attach to and cut the workpiece but does not contact the torch nozzle itself. The nozzle is the principal component that is damaged by the arc when the arc is not well controlled.

Another design consideration is the very high temperatures of the plasma, e.g. greater than 10,000° C. These temperatures introduce corresponding changes in the gas properties such as its density and viscosity. These considerations are significant on start up and cut-off. On start up the arc rapidly heats the gas which significantly decreases the gas density exiting the nozzle orifice. This presents the situation where the gas flow is choked in the nozzle orifice region. On cut-off, the situation reverses and there is a tendency for the gas in the plasma chamber to blow out of the chamber very suddenly as the mass flow increases when the temperature drops.

It is common industry practice to use hafnium or zirconium as the cathodic emitter insert in the electrode. Hafnium as of today, is the best choice for the cathodic emitting element when cutting with a reactive gas plasma. It exhibits the least wear of all other materials tried for this application, but is more costly than other materials. These electrodes nevertheless require frequent replacement. Lower wear has been associated with lower current levels, but at some point the reduction in performance associated with a reduced operating current becomes too great. Cooling the electrode has also been used to increase electrode life, whether by way of a gas flow or water flow placed in good thermal communication with the electrode. However, water cooling is expensive, cumbersome and is not desirable for low current units e.g. those rated below 100 amperes. Air cooling is less efficient and limits the maximum operating current of the torch, even one carrying a comparatively low current. Therefore, to date, the only practical solution to the electrode wear problem has been to replace the entire electrode again and again, despite the clear economic disadvantages of this approach.

It is therefore a principal object of the present invention to reduce the wear on the electrode of a plasma arc torch significantly and thereby extend its life.

Another principal object of this invention is to reduce electrode wear and thereby allow operation at higher current levels than are presently feasible, even when operating with reactive gases.

Another object of the invention is to achieve a better cut quality than has heretofore been possible by allowing a greater level of swirl.

Another object of the invention is to reduce the electrode wear in a manner so as to allow the substitution of the hafnium emitting element with other less expensive materials such as zirconium.

A further object of the invention is to provide the foregoing advantages while using standard electrode and nozzle constructions and without any significant increase in the incidence of damage to torch parts such as nozzle gouging.

Yet another object of the invention is to provide the foregoing advantages for existing plasma arc torch systems using only comparatively simple and inexpensive modifications.

A still further object is to provide the foregoing advantages at a favorable cost of manufacture and operation.

SUMMARY OF THE INVENTION

A plasma arc cutting torch, particularly one using a reactive gas and employed in cutting metallic materials, has a torch body that mounts an electrode and a nozzle in a spaced relationship to define a plasma chamber therebetween. An ionizable gas is fed by tubes, passages and chambers to and through the torch body to a swirl ring mounted in the torch body. The swirl ring feeds the gas to the plasma chamber where it is ionized and exits the torch via a central exit orifice formed in the nozzle. The torch also includes standard electrical connections to a power supply and an electrical controller to initiate a pilot arc in the gas in the chamber and then transfer the arc to a workpiece for cutting or other operations.

A principal feature of the present invention is the process step of altering the mass flow rate of the gas and/or its flow pattern immediately before and immediately after the step of cutting off of the current to the torch. The mass flow rate is reduced by reducing the gas flow, by closing off or reducing the gas flow to the plasma chamber. This mass flow rate reduction is timed to occur within a few hundred milliseconds before the current cut off, and preferably continue after cut off. The process step of cutting the arc current can be accomplished by a sudden step function of time or a gradual ramp function of time. The reduction in the gas flow may be coupled with a venting of the plasma chamber to atmosphere to facilitate a more rapid change in the gas flow pattern in the plasma chamber.

Alternatively, this invention includes altering the gas flow pattern from a standard swirling flow with a tangential component to one with a generally radial flow at its input to the plasma chamber, and then a generally axial flow through the chamber. This switch from a swirling flow to a radial/axial flow may be in conjunction with an overall reduction in the flow rate, and in conjunction with a decline in the current level and/or a venting of the plasma chamber to atmosphere. It has been found that by substition to a more axial flow a higher overall mass flow rate can be tolerated at the time just preceeding current off than with a swirling flow.

When there is no venting, which is the preferred case, the gas pressure has been found to decay generally exponentially and the aforementioned reductions in mass flow preferably occur within about 500 milliseconds of start of the current cut off step. The preferred current off step is a controlled linear decreasing ramp which follows the decrease in mass flow. This ramp would continue to very low values of current, until the arc goes out. This preferred plasma off process provides the desired reduction in electrode wear while still providing sufficient gas flow to stabilize the plasma arc and avoid damage to the nozzle. With venting, the gas flow through the plasma chamber and thus the gas pressure in the plasma chamber decay much more rapidly. However the precise optimal timing will vary with the application since it is a function of multiple variables, including gas type, current level, size of nozzle orifice, inlet flow area of swirl ring, gas pressure, gas flow rate, gas flow pattern (e.g. swirling or axial), and the physical distance between the plasma chamber and valving controlling flow conditions just prior to current cut-off.

Viewed as an apparatus, the invention includes, as a flow altering means, a valve in a line supplying gas to the plasma chamber that can be closed just prior to current cut off by a standard controller of a power supply. This flow rate reduction may be in coordination with a ramp down of the arc current. The reason for the current ramp down is to reduce the possibility of damage to the nozzle orifice during the time of low mass flow just prior to current off. In an alternate form, the vent line from the plasma chamber to atmosphere is controlled (opened and closed) by a valve. The valve is opened by the controller in the critical period just prior to current cut off. In another form, the apparatus includes two swirl rings or two separate positions of the same ring, one which produces a conventional swirl flow and a second which produces principally an axial flow without swirl. These rings may be mounted in an axially stacked array. These swirl rings are connected to a gas supply by independent feed lines at least within the torch body, and a valve, or valves, switches the gas flow just prior to cut off, in response to the controller, from the swirl inducing ring or ring portion to the radial/axial flow ring or ring portion. This switching may be in conjunction with venting and/or a flow rate reduction, and/or a current level reduction.

These and other features and objects of this invention will be more fully understood from the detailed description which should be read in light of the accompanying drawings.

DETAILED DESCRIPTION OF THE PREFERRED EMBODIMENTS

Figure 1A:
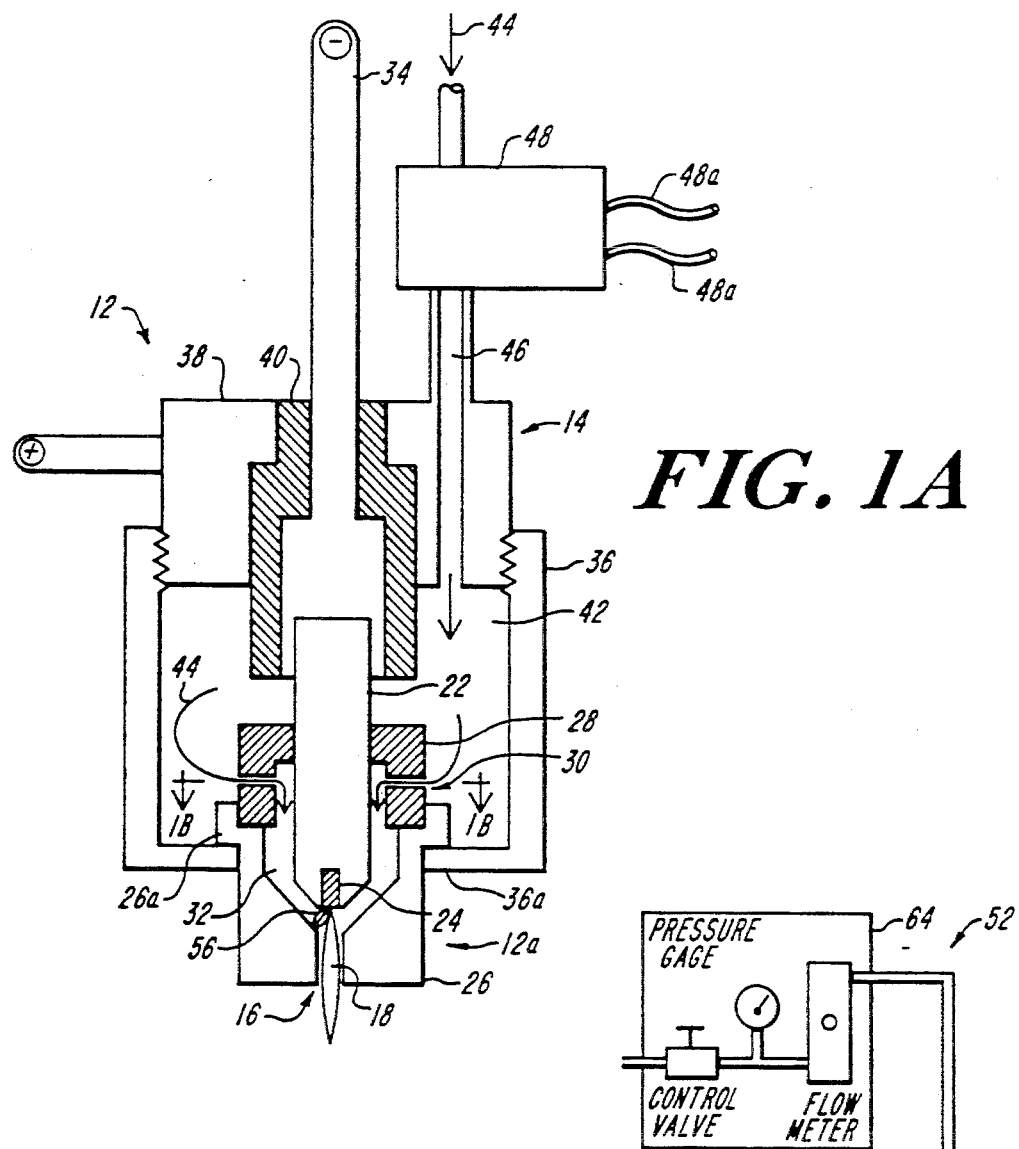
FIG. 1A is a simplified schematic view of a typical plasma arc torch constructed to operate according to the present invention.
Figure 1B:
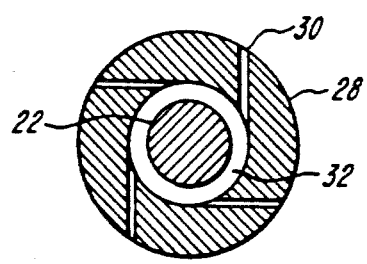
FIG. 1B is a view in horizontal section along the line 1B—1B in FIG. 1A.

FIGS. 1A and 1B show in simplified schematic form a typical plasma arc cutting torch 12 such as any of a variety of models of torches sold by Hypertherm, Inc. The present description is therefore intended to illustrate the basic principles and elements common to plasma arc cutting torches of this type, but not to describe construction details of any particular torch model. The torch has a body indicated generally at 14 which typically is cylindrical with an exit orifice 16 at one end, the lower end 12a as shown, through which a plasma arc 18, an ionized gas jet, passes and attaches to a metal workpiece 20 which is being cut. The gas can be non-reactive, such as nitrogen or a noble gas, but it can also be reactive, such as oxygen or air. A significant advantage of the present invention is that the torch can operate with a reactive gas and nevertheless have dramatic improvement in electrode wear as compared to the best results obtainable with any plasma arc cutting torch, regardless of the current level, or the effectiveness of the torch cooling arrangements.

The torch body 14 supports a cathode 22, commonly referred to as an electrode, which is typically made of copper and has a generally cylindrical configuration. An emitting element 24 is press fitted into the lower end face of the electrode 22. The electrode and the emitting element are centered within the torch body and aligned with the exit orifice 16. When using a reactive gas, the insert is typically formed of hafnium or zirconium. The body 14 also mounts a nozzle 26 with a central nozzle orifice that defines the torch exit orifice 16. The nozzle is spaced from the electrode. A swirl ring 28 having a set of radially offset gas distribution holes 30 is replaceably mounted in the torch body. It is positioned to feed a flow of the plasma gas from the holes 30 to a plasma arc chamber 32 defined, as shown, by the electrode, the nozzle and the swirl ring. The offset of the holes, best seen in FIG. 1B, introduce a tangential velocity component to the gas flow through the chamber 32 causing it to swirl. An advantage of this invention is that the level of swirl introduced by these holes can be greater than has heretofore practicable resulting in a better cut quality than has heretofore been attainable. The swirl ring is shown in a tight fitting, gas sealed relationship to the electrode. It will be understood, however, that the swirl ring is typically mounted in a support member and does not itself seal to the electrode. More generally, the particular construction details of the torch body and arrangements for mounting these elements directing gas and cooling fluid flows and providing electrical connections can and do take a wide variety of forms.

A negative power lead 34 surrounds the upper end of the electrode 22 to make a good electrical connection. A retaining cap 36 threads onto a current ring 38 that forms the upper end of the torch body 14. An insulator sleeve 40 separates and electrically isolates the current ring 38 from the negative power lead 34. The retaining cap has a lower lip 36a which engages a flange 26a on the nozzle in an abutting relationship. The retaining cap when tightened onto the ring 38 captures and replaceably secures the nozzle against the swirl ring. In an alternative construction not shown, it can also capture and secure the swirl ring between the nozzle and another internal support structure within the torch body. In the configuration shown, the retaining cap 36 also, in part, defines a gas plenum chamber 42 that acts as a local supply to the swirl ring 28 and the plasma chamber 32. A flow 44 of plasma gas passes through an inlet tube 46 which penetrates the current ring 38 to feed the gas to the plenum chamber 42. A solenoid valve 48 such as Model No. AFP33183 manufactured by Automatic Switch Company is secured in the inlet tube, preferably at a point closely spaced from the torch body. Control signals to the valve over lines 48a,48a open and close the valve to regulate the flow rate of the gas to the torch. In a pilot arc mode of operation, where a pilot arc is drawn between the electrode and the nozzle through the gas in the plasma chamber, the nozzle acts as an anode and the cap 36 and current ring 38 form a pilot arc current return circuit.

In operation, plasma gas 44 flows through the solenoid valve 48 and the inlet tube 48 into the plenum chamber 42. From there, it flows through the gas distribution holes 30 in the swirl ring 28 into the plasma arc chamber 32 and finally out of the torch through the nozzle orifice 16. When the torch is operating in the nontransferred pilot arc mode, a power supply 50 provides current to the torch at an appropriate voltage to initiate the pilot arc and then maintain it. The power supply can be any conventional regulated D.C. supply and includes a p.c. board or the like which controls the operation of the power supply and other components of the torch system such as flow control valves.

Figure 1C:
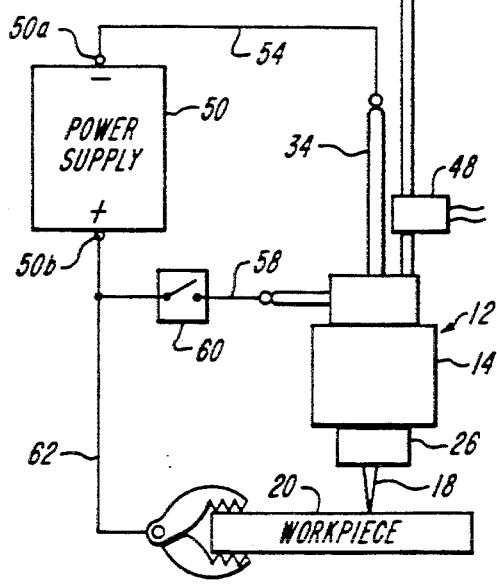
FIG. 1C is a simplified schematic view of a plasma arc cutting system according to the present invention using the torch shown in FIGS. 1A and 1B.

With reference to the complete plasma arc cutting torch system 52 depicted in FIG. 1c, the complete current path in the nontransferred pilot arc mode is from the negative power supply terminal 50a, through lead 54, the negative power lead 34, electrode 22, a pilot arc plasma (FIG. 1A), the nozzle 26, the retaining cap 36, the current ring 38, a pilot arc return lead 58, a closed pilot arc switch 60, and a power supply positive terminal 50b. When the torch 12 is lowered toward the workpiece 20, the arc transfers to the workpiece as the ionized plasma jet 18. This allows some current to flow from the workpiece through a ground lead 62 back to the power supply positive terminal 50b. When this transferred current path is established, the pilot arc switch opens and the torch is cutting the workpiece. In this transferred or cutting mode, the current path is from the power supply negative terminal 50a, the lead 54, negative power lead 34, electrode 22, the plasma arc or jet 18, the workpiece 20, the ground lead 62 and the power supply positive terminal 50b.

An operator sets a desired gas flow or pressure prior to initiating the pilot arc at a control console 64 which is removed from the torch itself. The console includes gas flow regulators and gas valving pressure gauges. The flow and pressure values set by the operator at the console correspond in a known wag to the actual gas flow and pressure in the plasma chamber 32 prior to the pilot arc. Starting the pilot arc heats the gas causing an increase in the gas temperature within the chamber and a decrease in the flow, in a manner well known in the art. A typical gas pressure in the chamber 32 during the pilot arc is 20 to 40 psi. The pilot arc is started by a high frequency spark or other means, such as a contact starting technique, all of which are well known in the art. During start up the plasma gas flows through the tube 46, solenoid valve 48, plenum chamber 42, swirl holes 30, the plasma chamber 32 and out the exit orifice 16. As noted above, the swirling flow established by the holes 30 is very important in obtaining a good quality cut and in stabilizing the arc within the nozzle exit orifice 16—to prevent the arc from impinging on the nozzle and gouging it.

Also as noted above, the torch begins cutting when it is brought close to the workpiece so that the arc transfers to the workpiece and the controller opens switch 60. After transfer, in normal operation the controller increases the current level to a predetermined value for cutting. This increase in current also results in an increase in the heating of the plasma gas, a further increase in the gas pressure in the plasma chamber, and a further decrease in the gas flow out of the nozzle exit orifice. The maximum recommended current levels vary greatly among different torches and applications, with currents in the range of about 20 to 200 amperes D.C. being characterized as low currents and those 200 and above being high currents. A typical current level for a water cooled cutting torch used to cut plate steel is 400 amperes.

A principal discovery of the present invention is that most of the loss of material (wear) of the electrode during its operation occurs not during start up or during the actual cutting, but rather when the current to the arc is shut off. While the mechanisms for this wear are not fully understood, there is evidence that the electrode becomes molten, at least in part, during operation and that on cut off of the electrical power wear is related to a complicated interaction between the molten surface(s) of the electrode and the flow and pressure of the plasma gas through the plasma chamber.

A principal feature of the present invention is a control of the plasma gas flow to the plasma chamber in conjunction with a controlled electrical shut off to reduce electrode wear substantially. In its simplest form, the invention involves a total shut off of the plasma gas flow to the chamber 30 just before (1) a total, step function shut off of the arc current or (2) at the same time the arc current starts a gradual shut off, but also just before a total shut off of the arc current. This effect is achieved by closing the solenoid valve 48 just prior to the total shutting off process of the arc current. The preferred process for shutting off the current is a controlled linear decreasing ramp which follows the decreasing mass flow. The timing of these shut offs is, however, critical. If the gas flow is allowed to decrease rapidly, there is a significant diminution of the swirling plasma flow that stabilizes the arc. Therefore the arc can and will attack and damage, or even destroy, the nozzle in a very short time. On the other hand, if the shut-offs are too close in time, the gas flow and pressure in the chamber 30, which decay in a generally exponential manner with the valve 48 shut, exhibit little change and wear occurs to about the same extent as if the valve 48 was left open. The gas flow shut off continues through the arc current shut off, and thereafter.

Figure 1D:
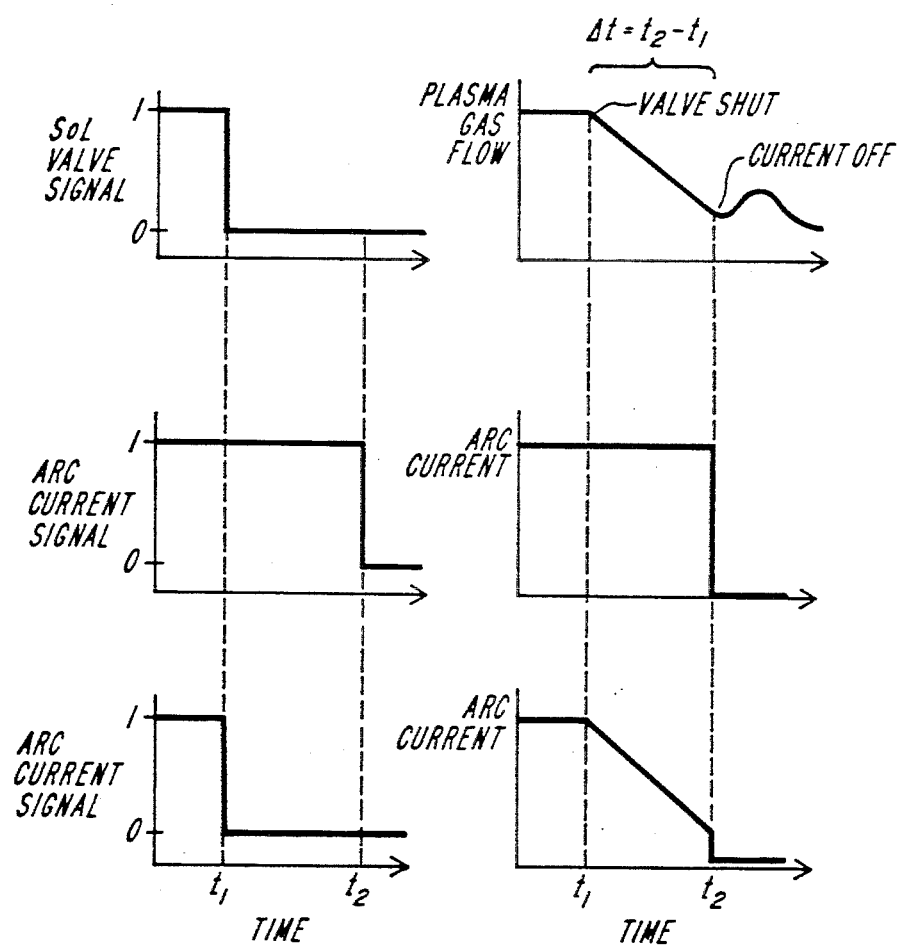
FIG. 1D is a six graph timing diagram of the gas flow alteration of the present invention in relation to the cut-off arc current.

The timing of the gas and current shut off processes in accordance with the present invention are illustrated by the timing diagrams of FIG. 1D. The three lefthand graphs show the control signals (whether a voltage signal, current signal, or otherwise) as a function of time. The first lefthand graph shows a control signal (applied over lines 48a,48a) to the solenoid valve 48 changing its state at a time $t_1$ (the signal goes from a "1" state to a "0" state which are indicative of either a digital switching or an analog change sufficient to produce the desired change in state of the valve 48). This change in the control signal closes the valve at $t_1$. The second lefthand graph shows a control signal for the arc current, a signal generated by the controller of the power supply 50. In accordance with this invention, the arc current control signal changes its state, again shown as a change from a "1" state to a "0" state, at a time $t_2$ which is after time $t_1$. The gas flow is therefore cut off before the arc current by a time interval $\Delta t$ equal to the difference between $t_2$ and $t_1$. The third lefthand graph shows an alternative control sequence for the arc current cut off process. In accordance with this invention the arc current control signal changes its state, again shown as a change from a "1" state to a "0" state, at a time $t_1$ which is the same time as the valve control signal. This change commences the operation of the controller to produce a ramp down of the arc current as shown in the lowermost righthand graph of FIG. 1D.

The righthand graphs in FIG. 1D show: 1) the gas flow rate through the plasma chamber 32; 2) the arc current shut off process as a sudden step off at $t_2$; and 3) an alternative arc current shut off process as a gradual linear ramp down from full current at $t_1$ to a minium sustainable current at $t_2$ when the arc current snuffs out to zero. These graphs are also presented as a function of time and for the same periods of time as the corresponding lefthand graphs. After closing the valve 48 at $t_1$, the gas flow falls steadily. A generally linear fall off in flow is shown, but the relationship is actually more complex and the curve is in fact generally exponential. The important factor is that the gas flow value falls substantially over the interval $\Delta t$ so that a) it is at a comparatively low value at $t_2$ when the arc current is shut off, as illustrated by the second righthand graph of FIG. 1D, or b) it is a comparatively low valve at $t_2$ following the current ramping down illustrated by the third righthand graph of FIG. 1D. The presently preferred embodiment of this invention uses non vented ramp down of the gas flow as shown in the upper righthand graph in combination with an arc current ramp down as shown in the lower righthand graph that follows the change of the gas flow over the time interval $\Delta t$. This preferred mode of operation seems to produce the least wear despite the fact that a lower arc current changes the gas density in a manner that produces an increased gas flow rate through the plasma chamber—other factors being constant.

While the precise value of $\Delta t$ varies with each torch and the particular operating parameters, for most low current plasma arc cutting applications a $\Delta t$ of 500 milliseconds or less has been found to be the right timing to reduce electrode wear. For the MAX 200 brand torch, a $\Delta t$ of roughly 250 to 300 milliseconds without venting and with a following current ramp down has been found to be optimal. In the operation of a MAX 100 brand torch after 120 cut cycles using this invention there is a pit depth (wear) of about 0.005 inch, whereas normal operation without using this invention produces a wear depth of about 0.025 inch in the same electrode insert 24. This wear reduction translates into an electrode life which is five times the best value that has ever before been attainable. This invention may also allow, on average, torches to be operated at powers in excess of their conventional ratings.

Note that at $t_2$ there is still a residual gas flow even though the gas feed is cut off at $t_1$. This ensures that until and at current cut off there is a sufficient flow in the chamber to stabilize the arc and prevent nozzle damage. Also, there is a brief surge in the flow after cut off of the current. This is believed to reflect a sudden cooling of the gas in the absence of the arc and a rapid out flow of gas from the torch driven by the gas pressure in the plasma chamber and the sudden change in the properties of the gas after the arc is extinguished. This phenomena suggests that while the gas flow to the torch can be reduced over the interval $\Delta t$ by reducing the flow 44 to the plasma torch, that a complete closure of the valve 48 is preferred since this closure upstream of the plasma chamber dampens the strength of the flow surge and limits the total volume of the flow when the current is cut off. As already stated, it is also within the scope of the present invention to reduce the current at $t_1$, e.g. by ramping it down over the interval $\Delta t$ rather than having an abrupt shut off at $t_2$. It is also under the scope of this invention to allow a reduction in the overall current prior to $t_1$, or after $t_1$, i.e., prior to or after closing the solenoid valve.

Figure 2A:
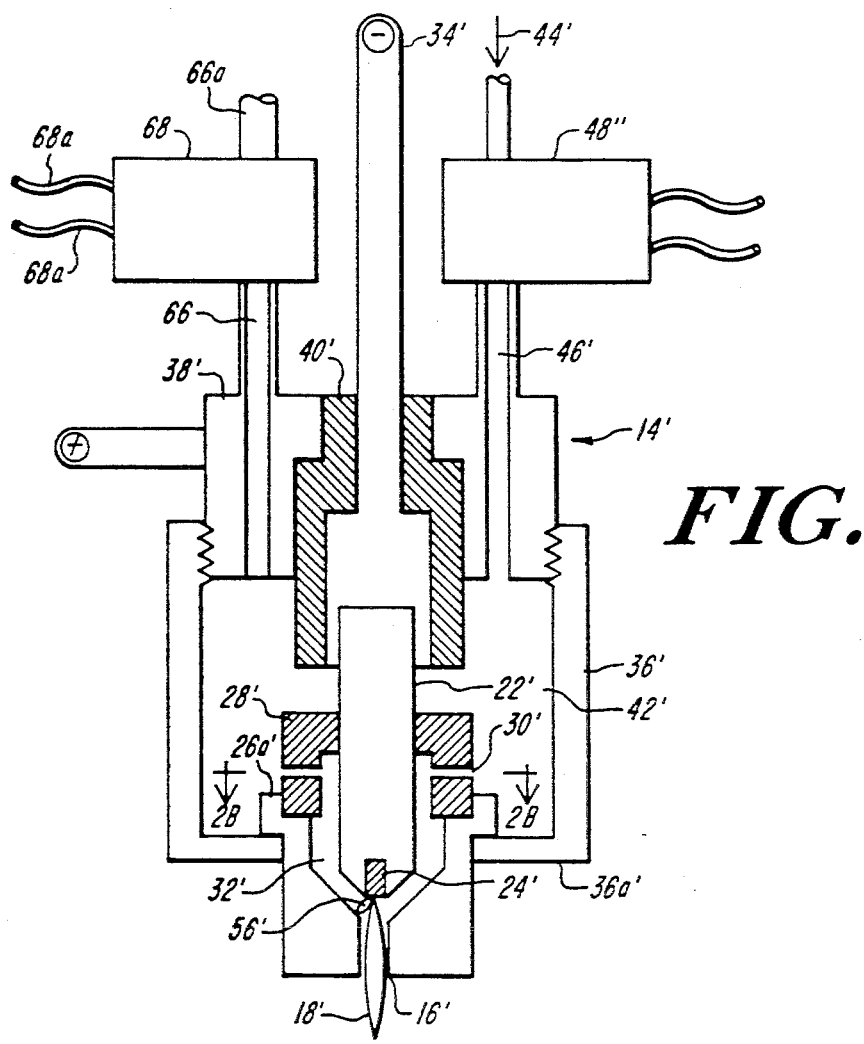
FIGS. 2A, 2B and 2C correspond to FIGS. 1A, 1B and 1C and show an alternative embodiment of the invention utilizing a valved vent in combination with a valved gas feed.
Figure 2B:
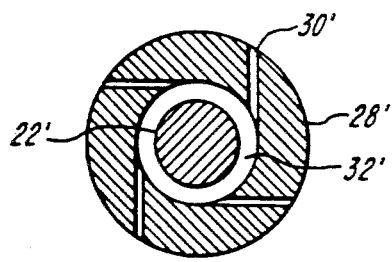
Figure 2C:
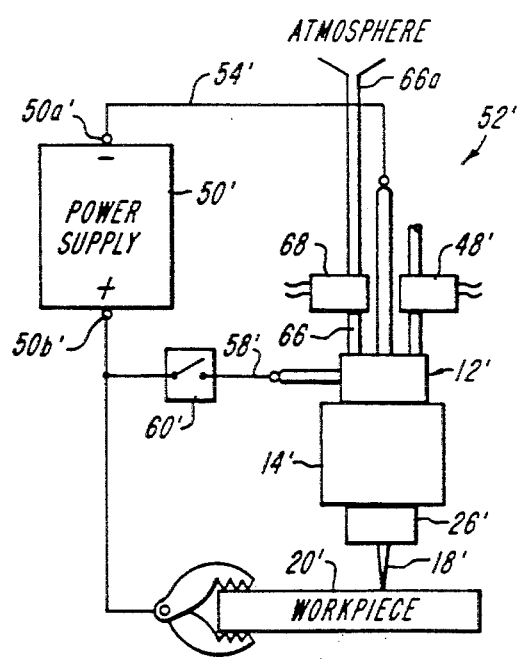

FIGS. 2A-2C show the plasma arc cutting torch 12' incorporating an alternative embodiment of the invention, like parts in the FIG. 2A-2C embodiment having the same reference numbers as in FIGS. 1A-1C, but with a prime. The structure and mode of operation of the torch 12' and torch system 52' is the same as described above with respect to the FIGS. 1A-1C embodiment, except for the addition of a vent tube 66 and an associated solenoid valve 68 connected in the vent tube to open and close it. The tube 66 penetrates the current ring 38' and is in fluid communication with the plenum chamber 42'. A control signal from the controller carried over lines 68a,68a operates the valve 68. In this embodiment, when the solenoid valve 48 is closed at time $t_1$. The vent valve 68 is opened. Because the vent tube 68 is open at its end 66a at atmosphere, or to some other lower pressure region such as a vacuum chamber, opening the valve 68 causes the gas flow and pressure in the plenum and the plasma chamber to decay more rapidly than the decay of the FIGS. 1A-1C embodiment. This allows the current to be shut off more quickly after the gas flow is cut-off at time t1. It has been discovered, however, that timing is very important in this configuration. Since by venting an alternative flow path is established, the flow through the nozzle can go to low values and cause the plasma to become unstable very quickly. In general, when venting is used the flow alteration preceeds the arc current shut off by a significantly short period of time and without venting. With this venting, the interval $\Delta t$ can be reduced from about 250 milliseconds to less than 5 milliseconds when operating a MAX 200 brand torch with air. This may reduce the likelihood of nozzle damage caused by a destabilized arc. It is also contemplated that valves 48 and 68 can be combined in a single venting type valve.

FIGS. 3A-3D show another embodiment of a torch 10" and torch system 52" utilizing according to the present invention, like parts being identified with the same reference numbers, but double primed. This embodiment utilizes the discovery that electrode wear can be reduced substantially if the gas flow through the plasma chamber is changed not only in flow rate, but also in flow pattern, just prior to current shut off. More specifically, electrode wear is reduced to almost negligible levels on current shut off if the degree of swirling of the gas is reduced just before cut-off. At moderate gas pressures, this result holds for even high gas flow rates (e.g. 120 scfh). In operation with the Hypertherm ® MAX 100 brand torch, negligible wear was observed when the gas flow into plasma chamber was radial (no swirl) and the gas pressure in the chamber was below 30 psi. While a perfectly radial flow and moderate to low gas pressures produce the best results, the invention also provides reduced electrode wear with less than a perfectly radial flow and at increased gas pressures. In this embodiment a major concern once again is destabilization of the plasma arc in the absence of a swirling flow. The solution of the present invention is to use a swirling flow, and then suddenly switch to a radial flow, with substantially- no interruption of the overall flow rate, immediately before current cut off. The torch 10" and system 52" accomplish this mode of operation.

Figure 3A:
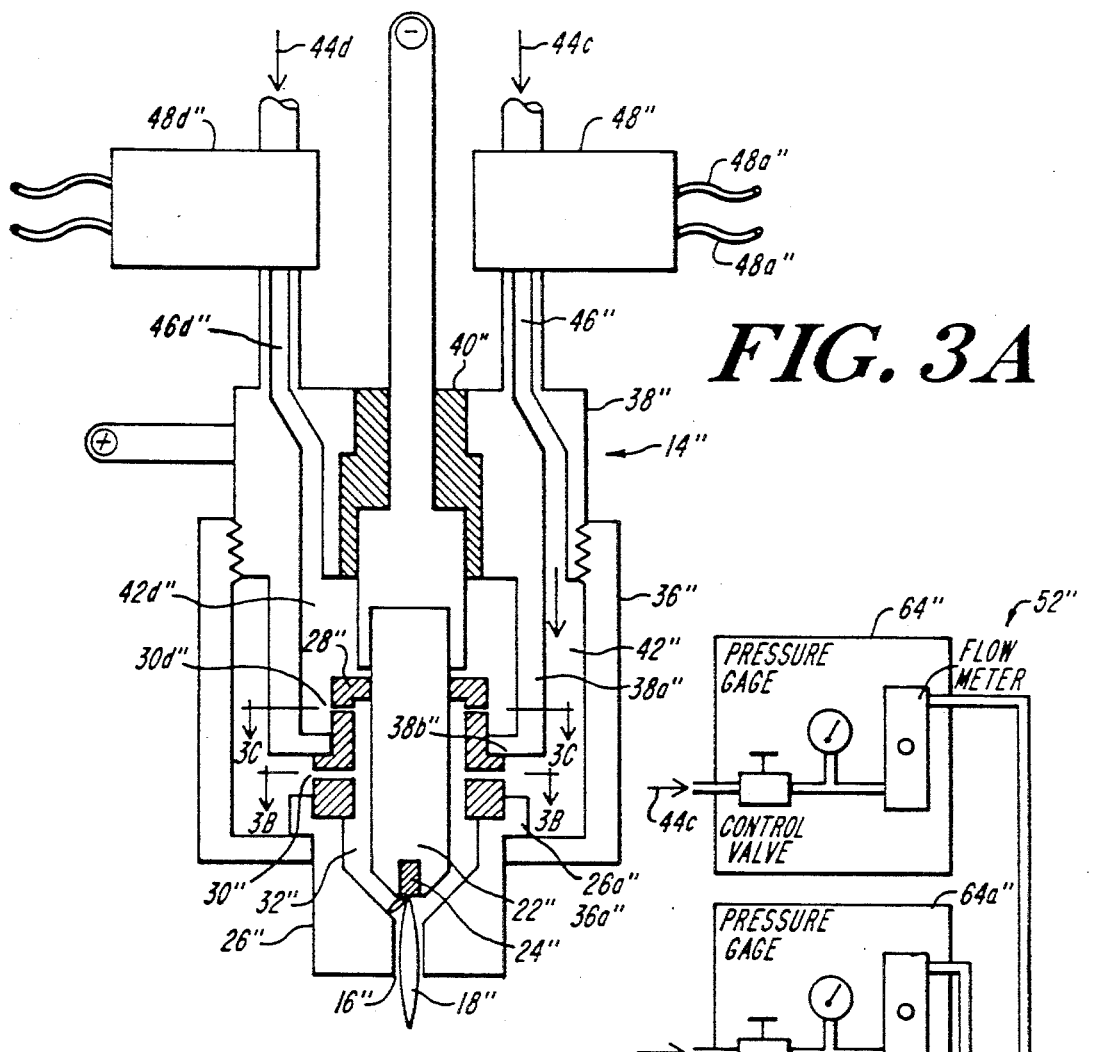
FIGS. 3A, 3B, 3C, and 3D correspond to FIGS. 2A-2C, FIGS. 3B and 3C corresponding to FIG. 2B, and show an alternative embodiment of the invention utilizing axial and radial inlet hole sets in a swirl ring to establish either swirled or axial gas flow patterns in the plasma chamber.
Figure 3B:
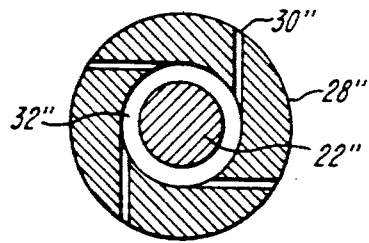

The torch 10" has generally the same construction as the torches 10 and 10', except that the torch is serviced by two separate gas feed lines, each with its own solenoid valve, which feed separate plenum chambers and in turn feed separate, independent inlet holes in the swirl ring 28" or an equivalent structure. In the preferred form shown, there is a first gas flow 44c which passes through the inlet tube 46", the valve 48", an annular plenum chamber 42", the inlet holes 30", the plasma chamber 32" and out the exit nozzle orifice 16". This gas flow path provides a swirling gas flow for cutting that produces a good quality cut and stabilizes the arc. The swirl is established by the holes 30" which are radially offset as is best seen in FIG. 3B. The plenum chamber 42" is defined by the same components as in previous embodiment except that the current ring has an annular downwardly extending wall 38a and a flange 38b at the lower edge that abuts a step recess in the swirl ring 28" in a gas tight seal. (It will be understood that the seal can be secured with O-rings, a labyrinth seal, or any conventional gas seal that also allows the swirl ring to be disassembled from the torch as necessary.) The wall 38a and flange 38b separate and isolate from one another the outer plenum chamber 42" and an inner plenum chamber 42d".

Figure 3C:
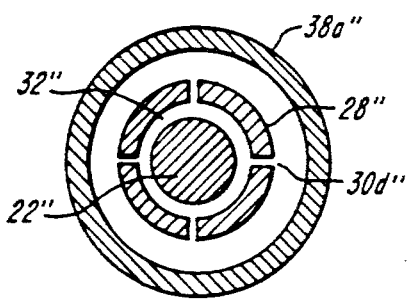

A gas flow 44d passes through an inlet tube 46d", a valve 48d", the plenum chamber 42d", inlet holes 30d", the plasma arc chamber 42" and out the exit nozzle orifice 16". This second gas flow path for the flow 44d uses inlet holes 30d" in the swirl ring that are generally radially directed as is best seen in FIG. 3C. The gas flow through the plasma chamber is therefore generally axial (downward) through the chamber 32" to the exit 16"; there is substantially no swirl.

In accordance with this process embodiment of the present invention, at a predetermined but very brief interval $\Delta t$ before the current to the torch is cut off, the controller closes the valve 48" for the flow 14c and opens the valve 48d" for the flow 44d. The interval $\Delta t$ for a MAX 100 brand torch operating with a reacting gas is typically less than 500 milliseconds. This change in flow pattern, with no other changes in flow or current parameters, has also been found to provide dramatic reductions in electrode wear. However, this embodiment can be combined with the mass flow rate reduction embodiment described above with respect to FIGS. 1A-1D and 2A-2C. For example, the current level can be ramped down after $t_1$.

Figure 3D:
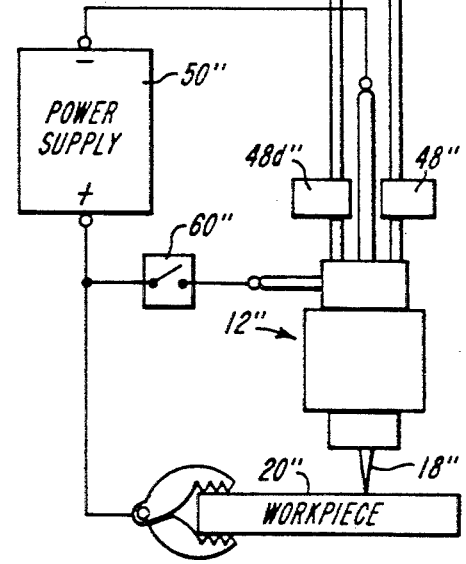

FIG. 3D shows a suitable system 52" for practicing the invention in this altered flow pattern mode. A control console 64" remote from the torch and therefore the substantial electromagnetic interference produced by the torch, controls the gas flow 44c. A like console 64a" controls the flow 44d". In practice the consoles 64" and 64a" can be a single unit.

While various time periods have been suggested above for $\Delta t$, the optimal interval will depend on the specific torch, its applications, and related parameters. In general, $\Delta t$ is a function of the type of gas, the current level, size of nozzle orifice, inlet flow area of swirl ring, the gas pressure, the gas flow rate, the gas flow pattern, and the physical separation between the solenoid valves in the inlet and vent tubes and the plasma. The separation is preferably less than 12 inches for the MAX 100 brand torch. This separation avoids delays and unintended variations in flow parameters due to the presence of a large fluid mass upstream of a plasma chamber and downstream of the valve. The values for an acceptable interval $\Delta t$ can readily be determined empirically. Also, while the invention has focused on the alteration of the gas flow just prior to cut off, it should be understood that the altered condition continues through electrical cut-off and for a brief period thereafter. However, the flow usually ceases entirely very shortly after cut-off, whether due to a closing of the solenoid valve in the inlet tube which eventually brings the flow through the plasma chamber to zero, or through a closing of the valve 48*d"* in the "radial" gas flow path to the radial hole 30*d"* in the FIG. 3A–3D embodiment.

There has been described a process and apparatus for reducing the wear on an electrode of a plasma arc torch, particularly a cutting torch, but in general for all types of plasma torches, e.g. ones for welding, spraying or other applications. The invention, in any of its embodiments, can reduce the wear that presently occurs on all electrodes to an extent that the life of the electrode is at least doubled and can be as much as ten times or more. The invention allows a given torch to be operated at increased power levels and with reactive gases. These advantages can be achieved with no diminution of cut quality, and using standard electrodes and nozzles. In fact, due to the discovery that the swirling flow does not already affect the electrode wear during cutting and knowing that a strong swirl yields high quality cuts, the swirl strength can now be increased in torches to improve cut quality. Moreover, existing plasma arc torches and complete torch systems can be readily modified to use the present invention.

While the invention has been described with respect to its preferred embodiments, it will be understood that various modifications and alterations will occur to those skilled in the art from the foregoing detailed description and the accompanying drawings. For example, the torch can have cooling passages not shown, be water cooled, or be adapted for welding or spray application of metal films. The torch can also use a variety of starting techniques with corresponding changes in the construction of the torch. The electrode and nozzle can assume a variety of configurations and constructions. The swirl ring 28" can be formed a two separate, axially stacked or axially spaced rings rather than as a single piece component as shown. These and other modifications and alterations are intended to fall within the scope of the appended claims.

What is claimed is:

1. A process for reducing the wear of an electrode of a plasma arc torch having a torch body that mounts a nozzle at one end of the torch adjacent a workpiece in a spaced relationship with respect to the electrode to form a plasma chamber therebetween, means for directing a flow of an ionizable gas to the plasma chamber, and means for conducting an electrical current through the electrode to ionize the gas to form the plasma arc, said flow directing means producing a swirling flow in said plasma chamber for at least a portion of the operation of the plasma arc, comprising, cutting off said electrical current at a time $t_2$ and altering the flow of the ionizable gas through said chamber at a time $t_1$ immediately before $t_2$, said altering maintaining a gas flow through said chamber prior to said cutting off sufficient to control said arc, said altering also continuing after said current cutting off, and said altering producing a termination of a swirling flow through said chamber generally coincident with said cutting off.

2. The electrode wear reduction process of claim 1 wherein said flow altering comprises a step selected from the group of steps consisting of (i) reducing the mass flow rate of the gas, (ii) reducing the swirl of the gas in the chamber, (iii) reducing the gas pressure in said chamber by reducing said electrical current just prior to said cutting off, and (iv) any combination of steps (i), (ii) and (iii).

3. The process of claim 2 further comprising the step of venting said plasma chamber in conjunction with said flow altering to alter the flow of the gas in the plasma chamber rapidly.

4. The process of claims 1, 2 or 3 wherein said altering occurs a sufficiently long time before said cutting off to reduce electrode wear but a sufficiently short time before cutting off that the arc does not damage the nozzle.

5. The process of claim 4 wherein said altering reduces the pressure of said gas in the plasma chamber generally exponentially and wherein said altering is initiated within about 500 milliseconds before said cutting off.

6. The process of claim 2 wherein said reducing of the mass flow rate comprises closing the flow of gas through the torch body to the plasma chamber at time $t_1$.

7. The process of claim 6 further comprising spacing the point of said closing off close to said plasma chamber.

8. The process of claim 2 wherein said reducing of the current is gradual over the period commencing with said flow altering at $t_1$ and ending with said cutting off at $t_1$.

9. The process of claim 8 wherein said current reduction is ramped down to follow said reduction in the flow rate of the gas to the plasma chamber.

10. The process of claim 8 wherein said current reduction is ramped down along with said reduction in the swirl of the gas flow in the plasma chamber.

11. The process of claim 2 wherein said reducing of the current commences prior to said flow altering at $t_1$.

12. The process of claim 2 wherein said reduction of the swirling includes switching from a flow into the plasma chamber that is radially offset to a flow into the chamber that is generally radial to produce a substantially axial flow of the gas through the plasma chamber.

13. The process of claim 12 wherein said altering is a combination of said switching to a generally radial flow and a generally concurrent reduction of said mass flow rate.

14. The process of claim 12 or 13 further comprising the step of venting the plasma chamber in conjunction with said switching to a generally radical flow.

15. In a plasma arc torch system including a plasma arc torch having an electrode mounted in a body of the torch in a spaced relationship with respect to a nozzle having an exit port and mounted on the torch body at one end of the torch adjacent a workpiece to define a plasma chamber therebetween that is in fluid communication with the exit port and a first swirl ring also mounted in the body that directs a flow of ionizable gas to the plasma chamber, and a power supply and means for conducting an electrical current from the power supply to the electrode and via the plasma arc when it is in a transferred arc mode to the workpiece, said power supply including means for starting up and cutting off the current to the torch, where the improvement comprises means for changing one parameter selected from the group consisting of (i) reducing the mass flow rate of the gas through the plasma chamber, (ii) changing the flow pattern of the gas through the plasma to a radial flow and (iii) the combination of the mass flow rate reduction and the gas flow pattern change, and means for operating said changing means immediately before cutting off the current, whereby the wear of the electrode is substantially reduced.

16. The improvement of claim 15 wherein said parameter changing means comprises a valve means for controlling the flow of the gas to the plasma chamber.

17. The improvement of claim 16 wherein said valve means closes to shut off the plasma gas flow to said plasma arc chamber at time $t_1$ within about 300 milliseconds before said current cut off at time $t_2$.

18. The improvement of claim 15 wherein said parameter changing means comprises a second swirl ring with generally radial flow ports for introducing gas to the plasma chamber mounted in said torch body in combination with said first swirl ring and valve means for swithing the gas flow to said plasma chamber from said first swirl ring to said second swirl ring.

19. The improvement according to claim 18 wherein said switching occurs within about 500 milliseconds of said current cut off.

20. The improvement of claim 15 wherein said parameter changing means includes vent means from said plasma chamber and valve means operable under the control of said operating means for opening and closing said vent means.

21. The improvement of claim 15 wherein said change occurs within about 5 milliseconds of said current cut off.

* * * * *

UNITED STATES PATENT AND TRADEMARK OFFICE
CERTIFICATE OF CORRECTION

PATENT NO.   : 5,070,227
DATED        : December 3, 1991
INVENTORS    : Luo et al.

It is certified that error appears in the above-identified patent and that said Letters Patent is hereby corrected as shown below:

In Claim 8, line 4, please delete "$t_1$" and add in its place --$t_2$--.

In Claim 15, line 9, after "the plasma chamber" please add --that is a swirling flow in said plasma chamber for at least a portion of the operation of the plasma arc--; and in line 18, after "the plasma chamber" add --so as to maintain a gas flow through said chamber prior to cutting off the current sufficient to control said plasma arc so as to terminate said swirling gas flow through said chamber generally coincident with said cutting off--.

Signed and Sealed this

Thirty-first Day of August, 1999

Attest:

Q. TODD DICKINSON

*Attesting Officer*          Acting Commissioner of Patents and Trademarks